United States Patent [19]

Moon et al.

[11] Patent Number: 5,103,352
[45] Date of Patent: Apr. 7, 1992

[54] PHASED SERIES TUNED EQUALIZER

[75] Inventors: Wook Y. Moon; Robert Y. Noguchi, both of Colorado Springs, Colo.

[73] Assignee: Digital Equipment Corporation, Maynard, Mass.

[21] Appl. No.: 369,742

[22] Filed: Jun. 22, 1989

[51] Int. Cl.⁵ .......................... G11B 5/03; G11B 5/09; H03K 5/00
[52] U.S. Cl. ...................................... 360/65; 360/67; 360/46; 307/262
[58] Field of Search ...................... 360/65, 67, 45, 46; 375/12, 16; 333/28 T, 28 R; 381/99, 100; 364/825; 307/262, 555, 556, 491, 498; 328/162, 163, 165; 330/304

[56] References Cited

U.S. PATENT DOCUMENTS 3,333,185 7/1967 Riseman et al. ................... 364/828
4,314,288 2/1982 Gyi ...................................... 360/67

Primary Examiner—Aristotelis Psitos
Assistant Examiner—Varsha V. Sheladia
Attorney, Agent, or Firm—Arnold, White & Durkee

[57] ABSTRACT

A method and apparatus for equalizing a signal with weighted first and second derivative signals extracted from a resistance-capacitance-inductance series circuit.

20 Claims, 3 Drawing Sheets

PHASED SERIES TUNED EQUALIZER

FIELD OF THE INVENTION

The present invention relates to signal processing circuits and methods for equalizing wide-band electronic signals, and more particularly to an equalization circuit and method for correcting amplitude and phase shifts in wide-band digital read signals recovered from magnetic storage drives.

BACKGROUND OF THE INVENTION

Data signals are generally stored on magnetic storage media as a series of sequential magnetic field transitions according to a digital code format which provides the best combination of low required storage system bandwidth and high storage medium density. Because the read signals from such magnetic media are pulses which represent the stored magnetic transitions, these read signals are characterized by a series of closely packed, generally spike-shaped pulses, which are then processed to reconstruct the written data. Of course, signal decoding is required, because the read signals only represent the transitions of magnetic states, not the coded data pulses themselves. Due to the bandwidth-limited nature of the read channel for the data storage system, the pulses comprising the read signal generally suffer distortion in both amplitude and phase. As a result of this distortion, the pulses have less amplitude, longer duration, and more asymmetry than if the read channel were not so bandwidth limited. This distortion can cause the read signal pulses to overlap each other to such an extent that they are unreadable.

To maximize the writing speed and information storage density in data storage drives, the read signal is equalized to correct the amplitude and phase distortion of the pulses so that the read signals are usable even with very high density storage media. Such equalization usually includes a multitap delay line or a cascaded, complex combination of inductors, capacitors and resistor networks.

Equalization networks generally require provisions for adjustment of their characteristics to account for component variations in the equalization network or the associated storage medium drive. Although tapped delay line equalizers are available with programmable characteristics, these units are bulky and expensive for commercial use. They also have unit-to-unit characteristic variations. Equalizers using discrete inductors, capacitors and resistors require component replacement to change characteristics, which is difficult and expensive. These equalizers also require delay lines to properly phase their equalizing signals.

SUMMARY OF THE INVENTION

The present invention achieves read signal equalization with a simple series tuned circuit configuration which combines compact design, adjustability of equalization and low cost. Each component of a resistance-inductance-capacitance (RLC) series tuned circuit has its individual component potential drops individually amplified, and the three amplified values are summed to produce an equalized output signal. The equalization is easily adjustable by changing the resonance of the tuned circuit and individually altering the gains of the amplified signals before they are combined. Furthermore, no delay lines are necessary for phasing because the equalizing signals are developed across the same series tuned circuit.

DESCRIPTION OF THE PREFERRED EMBODIMENT

Figure 1:
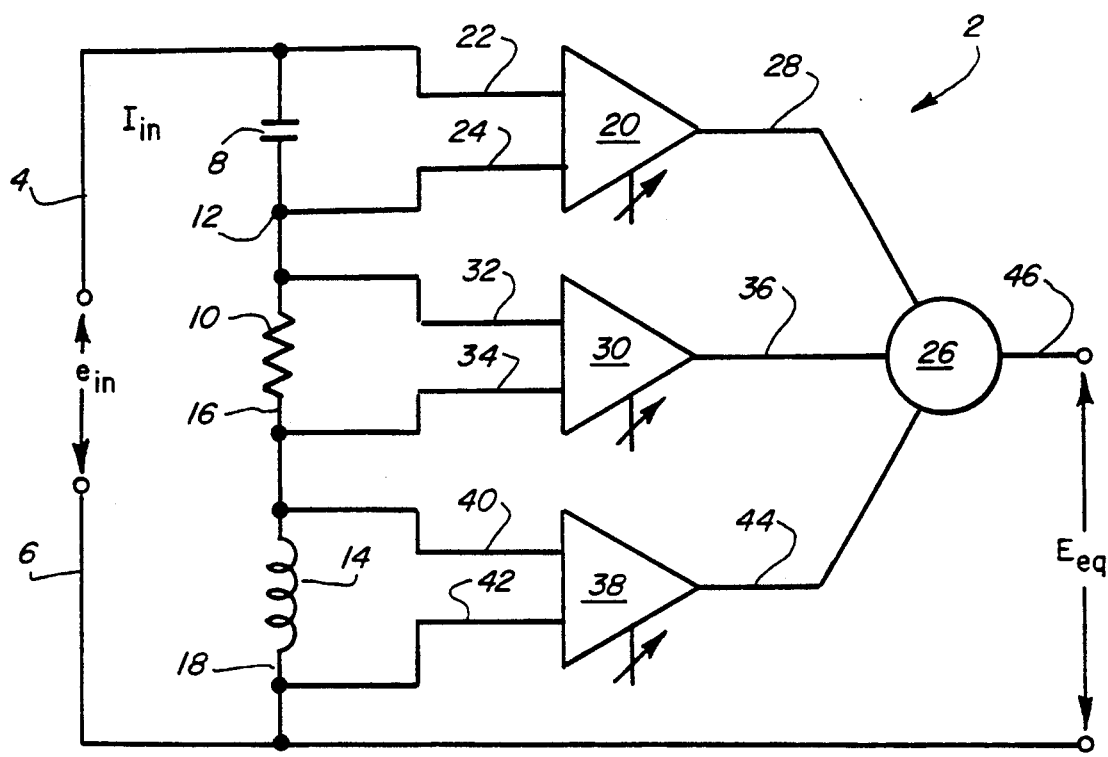
FIG. 1 is a schematic diagram of a preferred embodiment of the invention.

Referring to the drawings, wherein like reference characters designate like or corresponding parts throughout the views, FIG. 1 shows a generalized configuration for the preferred embodiment of the invention. An equalizer system 2 has a read signal input between a read signal input line 4 and a signal return line 6. The read signal is fed to a capacitance 8 on the line 4. The capacitance 8 capacitively couples the read signal to a resistance 10 via a line 12. The resistance 10 in turn resistively couples the read signal to an inductance 14 via a line 16. The inductance provides an inductive return path for the read signal to the signal return line 6 via a line 18. Thus, a complete series circuit is established for the read signal through the capacitance 8, the resistance 10 and the inductance 14. Of course, the circuit acts as a potential divider, and the potential across each element of the divider will be a function of frequency. According to the present invention, the potentials developed across each one of the elements, that is, the capacitance 8, the resistance 10 and the inductance 14, are proportioned and combined to provide an equalized read output signal, as described in detail below.

The potential difference across the capacitance 8 is coupled to a first differential amplifier 20 via a line 22 fed from the line 4 and a line 24 fed from the line 12. The output of the first differential amplifier 20 is fed to a first input of a three input summing network 26 via a first amplifier output line 28.

The potential difference across the resistance 10 is coupled to a second differential amplifier 30 via a line 32 fed from the line 12 and a line 34 fed from the line 16. The output of the second differential amplifier 30 is fed to a second input of the three input summing network 26 via a second amplifier output line 36.

The potential difference across the inductance 14 is coupled to a third differential amplifier 38 via a line 40 fed from the line 16 and a line 42 fed from the line 18. The output of the third differential amplifier 38 is fed to a third input of the three input summing network 26 via a third amplifier output line 44.

The summing network 26 combines the outputs of the first amplifier 20, the second amplifier 30 and the third amplifier 38 to provide a combinational output signal on a summing network output line 46 relative to the signal return line 6. The combinational output signal of the summing network 26 on the line 46 serves as an effective amplitude and phase equalized output signal corresponding to the input signal on the line 4 when the circuit parameters of the capacitance 8, the resistance 10, the inductance 14 and the gains of the first amplifier 20, the second amplifiers 30 and the third amplifier 38 are adjusted is described below.

Figure 2:
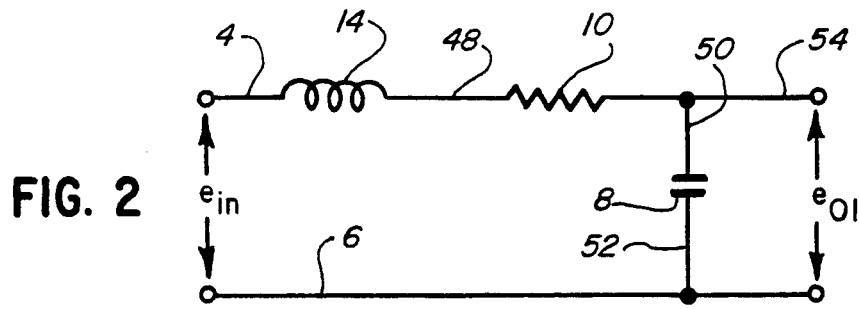
FIG. 2 is a two pole Butterworth filter network.
Figure 3:
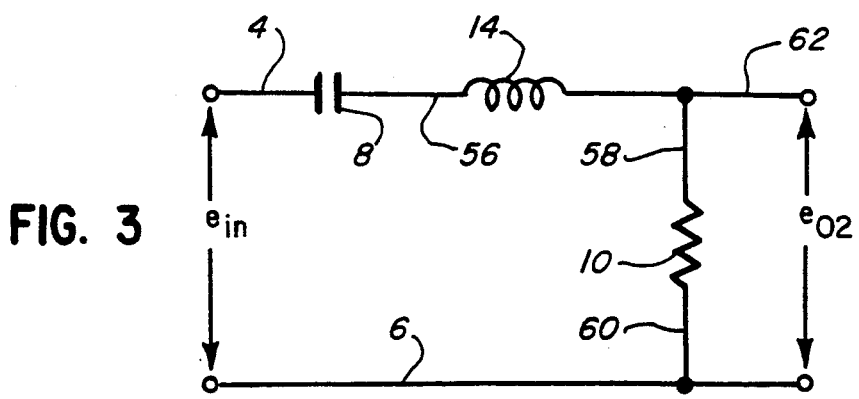
FIG. 3 is a reactive capacitance-inductance-resistance potential divider with a common resistance element.
Figure 4:
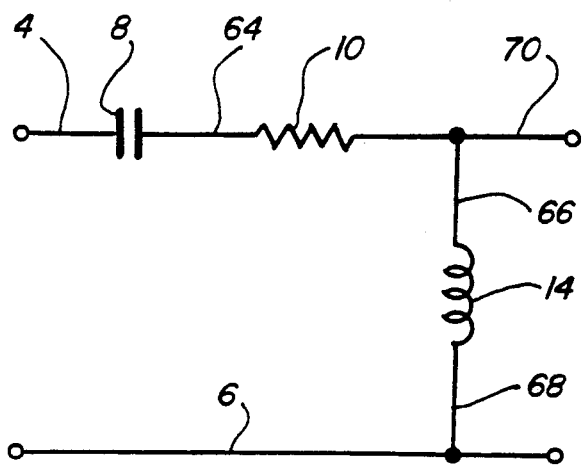
FIG. 4 is a reactive capacitance-inductance-resistance potential divider network with a common inductance element.

The operation of the present invention is easily understood by considering the operation of the circuits shown in FIGS. 2 through 4 in combination with FIG. 1. FIG. 2 shows the capacitance 8, the resistance 10 and the inductance 14 arranged as a simple two pole Butterworth filter. For this purpose, the inductance 14 is shown connected to the input line 4, the resistance 10 coupled to the inductance 14 via a line 48, the capacitance 8 coupled to the resistance 10 via a line 50, and the capacitance 8 coupled to the signal return line 6 via a line 52. Thus, a reactive circuit is formed for the input signal through the input line 4, the inductance 14, the resistance 10 and the capacitance 8 to the signal return line 6. An output from this filter network which provides a common ground with the input line 4 is on a line 54 coupled to the line 50. The output on the line 54 thus provides reactive potential division of the input signal on the line 4 according to the well known relationship:

$$e_{01} = e_{in} \frac{1/sC}{sL + R + 1/sC} \quad \text{(Eq. 1)}$$

wherein:
$e_{01}$ = output signal potential on the line 54
$e_{in}$ = input signal potential on the line 4
C = capacitance of the capacitance 8 in farads
L = inductance of the inductance 14 in henrys
R = resistance of the resistance 10 in ohms
$s = 2\pi$ (frequency of the input signal on the line 4)

This relationship may be conveniently rearranged as:

$$e_{01}/e_{in} = \frac{1}{LCs^2 + RCs + 1} \quad \text{(Eq. 2)}$$

Referring back to FIG. 1, it may be seen that the potential difference developed across the capacitance 8 to the first differential amplifier 20 via the lines 22 and 24 corresponds to the relationship expressed by Eq. 2. If the gain of the first amplifier 20 is represented as K1 and its output as E1, the output of the first amplifier 20 on the line 28 may be expressed as:

$$E1 = K1 \frac{1}{LCs^2 + RCs + 1} e_{in} \quad \text{(Eq. 3)}$$

FIG. 3 shows the capacitance 8, the resistance 10 and the inductance 14 rearranged as a reactive potential divider which provides an output corresponding to the potential across the resistance 10. The capacitance 8 is coupled to the input line 4, the inductance 14 is coupled to the capacitance 8 via a line 56, the resistance 10 is coupled to the inductance 14 via a line 58, and the resistance 10 is coupled to the signal return line 6 via a line 60. Thus, a reactive circuit is formed for the input signal through the input line 4, the capacitance 8, the inductance 14 and the resistance 10 to the signal return line 6. An output from this circuit on an output line 62 coupled to the line 58 provides a potential across the resistance 10 relative to the signal return line 6, thus providing a reactive potential divider with an output on the line 62 relative to the signal return line 6, which may be represented as $e_{02}$, corresponding to:

$$e_{02} = e_{in} \frac{R}{1/sC + sL + R} \quad \text{(Eq. 4)}$$

This relationship may conveniently be rearranged as:

$$e_{02}/e_{in} = RCs \frac{1}{LCs^2 + RCs + 1} \quad \text{(Eq. 5)}$$

It should be noted that Eq. 5 corresponds to Eq. 2 except for the term RCs, which is simply a first derivative term multiplied by a constant, as well known in the art. Thus, Eq. 5 is the first derivative of Eq. 2, multiplied by a constant.

Referring back to FIG. 1, it may be seen that the potential difference fraction of the input signal on the line 4 developed across the resistance 10 and coupled to the second amplifier 30 via the lines 32 and 34 corresponds to the relationship expressed by Eq. 5. If the gain of the second amplifier 30 is expressed as K2 and its output as E2, the output of the second amplifier 30 on the line 36 may be expressed as:

$$E2 = K2RCs \frac{1}{LCs^2 + RCs + 1} e_{in} \quad \text{(Eq. 6)}$$

Comparing Eq. 3 with Eq. 6, it may be seen that the relationship expressed in Eq. 6 is the first derivative of the relationship expressed in Eq. 3 multiplied by a constant.

FIG. 4 shows the capacitance 8, the resistance 10 and the inductance 14 rearranged as a reactive potential divider which provides an output corresponding to the potential across the inductance 14. The capacitance 8 is shown connected to the input line 4, the resistance 10 is coupled to the capacitance 8 via a line 64, the inductance 14 is coupled to the resistance 10 via a line 66, and the inductance 14 is coupled to the signal return line 6 via a line 68. Thus, a reactive circuit is formed for the input signal through the input line 4, the capacitance 8, the resistance 10 and the inductance 14 to the signal return line 6. An output from this circuit on an output line 70 coupled to the line 66 provides a potential across the inductance 14 relative to the signal return line 6, thus providing a reactive potential divider with an output on the line 70 relative to the signal return line 6, which may be expressed as $e_{03}$, corresponding to:

$$e_{03} = e_{in} \frac{SL}{1/sC + R + sL} \quad \text{(Eq. 7)}$$

This relationship may be conveniently rearranged as:

$$e_{03}/e_{in} = LCs^2 \frac{1}{LCs2 + RCs + 1} \quad \text{(Eq. 8)}$$

It should be noted that Eq. 8 corresponds to Eq. 2 except for the term $LCs^2$, which is simply a second derivative term multiplied by a constant, as well known in the art. Thus, Eq. 8 is the second derivative of Eq. 2, multiplied by a constant.

Referring back to FIG. 1, it may be seen that the potential difference fraction of the input signal on the line 4 developed across the inductance 14 and coupled to the third amplifier 38 via the line 40 and 42 corresponds to the relationship expressed by Eq. 8. If the gain of the third amplifier 38 is expressed as K3 and its output as E3, the output of the third amplifier 38 on the line 44 may be expressed as:

$$E2 = K3LCs^2 \frac{1}{LCs^2 + RCs + 1} e_{in} \qquad \text{(Eq. 9)}$$

Comparing Eq. 3 with Eq. 9, it may be seen that the relationship expressed in Eq. 9 is the second derivative of the relationship expressed in Eq. 3 multiplied by a constant.

Figure 5:
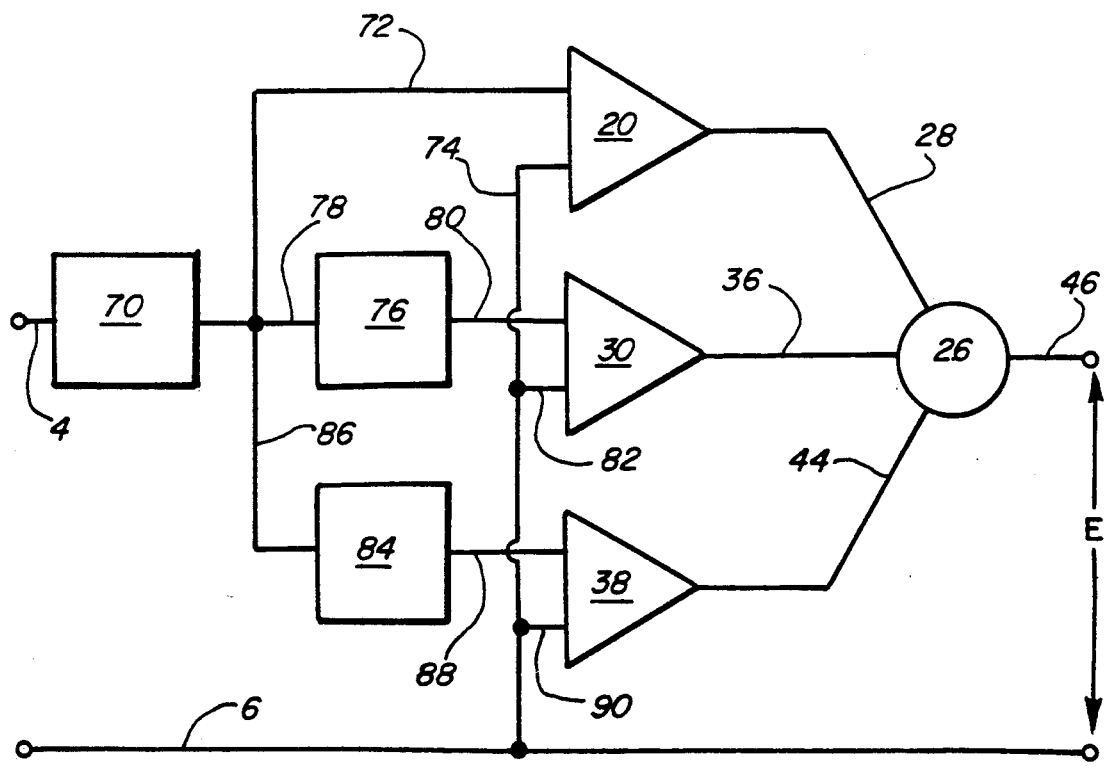
FIG. 5 is a functionally equivalent block diagram of the preferred embodiment shown in FIG. 1.

The equivalent functional block diagram of the present invention of FIG. 1 is illustrated in FIG. 5. The input signal line 4 is coupled to a 2 pole Butterworth filter 70 having the relationship shown in Eq. 2. The output of the filter 70 is coupled to one input of the first amplifier 20 via a line 72, and the other input of the first amplifier 20 is coupled to the signal return line via a line 74. The output of the first amplifier 20 on the line 28, and its contribution to the equalized output signal through the summing network 26 on the line 46, is the relationship shown in Eq. 3, that is:

$$E1 = K1 \frac{1}{LCs^2 + RCs + 1} e_{in}$$

The output of the filter 70 is also coupled to a first derivative network 76 via a line 78. The first derivative network 76 has a value of RCs, so that its output on a line 80 has the relationship shown in Eq. 5. The output of the first derivative network 76 on the line 80 is fed to one of the inputs of the second amplifier 30. The other input of the second amplifier 30 is coupled to the signal return line 6 via the line 74 and a line 82. The output of the second amplifier 30 on the line 36, and its contribution to the equalized output signal through the summing network 26 on the line 46, is the relationship shown in Eq. 6, that is:

$$E_2 = K2RCs \frac{1}{LCs^2 + RCs + 1} e_{in}$$

The output of the filter 70 is also coupled to a second derivative network 84 via a line 86. The second derivative network 84 has a value of $LCs^2$, so that its output on a line 88 has the relationship shown in Eq. 8. The output of the second derivative network 84 on the line 88 is fed to one of the inputs of the third amplifier 38. The other input of the third amplifier 38 is coupled to the signal return line 6 via the line 74 and a line 90. The output of the second amplifier 38 on the line 44, and its contribution to the equalized output signal through the summing network 26 on the line 46, is the relationship shown in Eq. 9, that is:

$$E3 = K3LCs^2 \frac{1}{LCs^2 + RCs + 1} e_{in}$$

Therefore, if the equalized output signal on the line 46 is represented as Eeq, it may be expressed as the sum of E1, E2 and E3, or $$E_{eq} = e_{in} \frac{1}{LCs^2 + RCs + 1} (K1 \pm K2RCs - K3LCs^2) \qquad \text{(Eq. 10)}$$

For purposes of equalization, it is desirable to combine the input signal to be equalized with some proportion of its second derivative to correct for high frequency amplitude distortion. In the case of pulse signals representing magnetic transitions recorded on magnetic recording media, the pulses may be "slimmed" by superposition of the amplified input signal with the variably weighted second derivative of the itself to correct for overly broad pulses resulting from high frequency amplitude distortion. It is also desirable to combine the input signal to be equalized with some proportion of its first derivative to correct for high frequency phase shift distortion. In the case of pulse signals representing magnetic transitions recorded on magnetic recording media, the pulses may be "tilted" by superposition of the amplified input signal with the variably weighted first derivative of itself to correct for asymmetric pulses caused by high frequency phase shift distortion.

With the preferred embodiment of the invention shown in FIG. 1, it is apparent that the input signal on the line 4 is effectively low-pass filtered before being amplified by the first amplifier 20. This is apparent from its equivalent circuit shown in FIG. 5, wherein the Butterworth filter 70 filters the input signal according to the relationship $$\frac{1}{LCs^2 + RCs + 1}$$

before any additional signal processing is done.

Of course, in practice the pass-band of this filtration is selected to be wide enough to not adversely affect the waveform of the input signal. That is, the high frequency attenuation due to such low-pass filtering is insignificant compared to the correction provided by the remainder of the equalizer system 2. Furthermore, the "damping ratio" of the circuit comprising the capacitance 8, the resistance 10 and inductance 14 is selected so that no significant phase distortion of the input signal occurs. In this case, the damping ratio is simply $$\frac{R}{2} \sqrt{\frac{C}{L}} \; ,$$

and selected to have a value of 0.707.

Referring to Eq. 2, it may be seen that:

$$e_{01} = e_{in} \frac{1}{LCs^2 + RCs + 1} \qquad \text{(Eq. 11)}$$

Of course, $e_{01}$ represents the filtered input signal on the line 72 of FIG. 5 before amplification. Likewise, it may be seen from Eq. 5 that:

$$e_{02} = e_{in} RCs \frac{1}{LCs^2 + RCs + 1} \qquad \text{(Eq. 12)}$$

$e_{02}$ represents the first derivative of $e_{01}$ on the line 80 of FIG. 5. Finally, it may be seen from Eq. 8 that:

$$e_{03} = e_{in} LCs^2 \frac{1}{LCs^2 + RCs + 1} \quad \text{(Eq. 13)}$$

$e_{03}$ represents the second derivative of $e_{01}$ on the line 88 of FIG. 5.

The equalized output signal $E_{eq}$ from the summing network 26 on the line 46 in both FIGS. 1 and 5 may be expressed in terms of the signals $e_{01}$, $e_{02}$ and $e_{03}$, and the amplifier gains K1, K2 and K3, as follows:

$$E_{eq} = e_{01}K_1 + e_{02}K_2 + e_{03}K_3 \quad \text{(Eq. 14)}$$

In Eq. 14, the first term represents the amplified filtered input signal, the second term represents the weighted first derivative of the amplified filtered input signal, or "tilt" factor, and the third term represents the weighted second derivative of the amplified filtered input signal, or "slim" factor. The individual gains K1, K2 and K3 may be adjusted to provide a wide range of "slim" and "tilt" component amplitudes to the amplified input signal, depending upon the degree of equalization required. Generally, the degree of equalization must be empirically determined to suit the requirements of specific magnetic recording systems.

Figure 6:
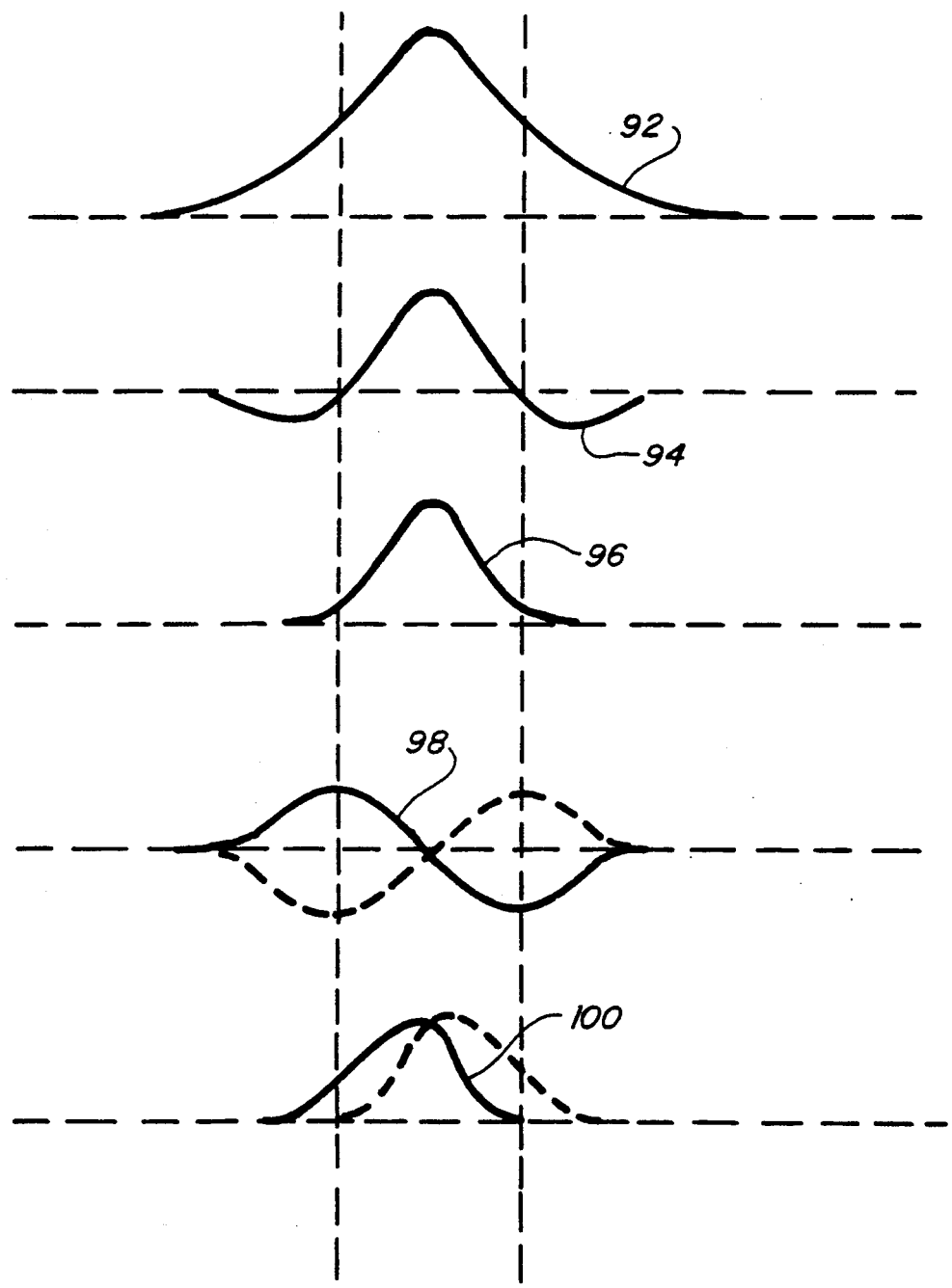
FIG. 6 is a series of signal waveforms developed in the preferred embodiment for equalization.

FIG. 6 shows how the input signal combines with corresponding "slim" and "tilt" components to provide an equalized output signal for the system 2 in FIG. 1. An input waveform 92 represents the unequalized input signal after amplification on the line 28 of the system 2. A "slimming" waveform 94 represents the amplified second derivative signal on the line 44. A "slimmed" waveform 96 represents the "slimming" waveform 94 superimposed on the input signal waveform 92, as done in the summing network 26. A "tilting" waveform 98 represents the amplified first derivative signal on the line 36. An equalized output signal waveform 100 represents the "tilting" signal waveform superimposed on the "slimmed" waveform 96, as is done by the summing network 26. Comparing the equalized waveform 100 with the unequalized waveform 92, it is evident that significant narrowing and contouring of the input signal pulses is possible with the present invention.

Of course, many alternate arrangements can be used to combine the signals developed across each of the components of the series tuned RLC circuit shown in FIG. 1 to produce an equalized output signal. For instance, the adjusted filtered input signal developed across the capacitance 8 may first be combined with a portion of the adjusted first derivative signal across the resistance 10 to produce a "tilted" waveform signal to correct asymmetric pulses caused by high frequency phase shift distortion. The adjusted filtered input signal developed across the capacitance 8 may then be combined with a portion of the adjusted second derivative signal across the inductance 14 to produce a "slimmed" waveform signal to correct overly broad pulses resulting from high frequency amplitude distortion. The "tilted" waveform signal and the "slimmed" waveform signal may then be combined to produce an amplitude and phase equalized output signal.

Thus, there has been described herein a circuit and method for equalizing an input signal with weighted values of its first and second derivatives extracted from a simple series tuned resistance-inductance-capacitance circuit. It will be understood that various changes in the details, arrangements and configurations of the parts and systems which have been described and illustrated above in order to explain the nature of the present invention may be made by those skilled in the art within the principle and scope of the present invention as expressed in the appended claims.

What is claimed is:

1. A method of amplitude and phase equalizing an input signal with a resistance, a capacitance and an inductance arranged in a series tuned circuit configuration, comprising the steps of:
    filtering said input signal with said series tuned circuit to form a filtered input signal;
    deriving a first derivative signal of said filtered input signal from said series tuned circuit for use in correcting for high frequency phase shift distortion;
    deriving a second derivative signal of said filtered input signal from said series tuned circuit for use in correcting for high frequency amplitude distortion; and
    combining said filtered input signal, said first derivative signal, and said second derivative signal, to form an amplitude and phase equalized output signal.

2. The method recited in claim 1, further comprising the steps of:
    amplifying said filtered input signal by an adjustable factor K1;
    amplifying said first derivative signal by an adjustable factor K2;
    amplifying said second derivative signal by an adjustable factor K3; and
    said step of combining comprises superimposing said amplified filtered input signal, said amplified first derivative signal and said amplified second derivative signal to form said amplitude and phase equalized output signal.

3. The method recited in claim 2, further comprising the steps of:
    selecting a value C for said capacitance and a value L for said inductance to resonate said series tuned circuit above the frequency of said input signal;
    selecting a value R for said resistance to provide a circuit damping ratio to assure no significant phase distortion of said input signal; and
    coupling said input signal across said series tuned circuit.

4. A method of amplitude and phase equalizing a pulse input signal representing magnetic transitions recorded on magnetic recording media with a series tuned circuit having a resistance, a capacitance and an inductance, comprising the steps of:
    filtering said input signal with said series tuned circuit to form a filtered input signal;
    deriving the first derivative signal of said filtered input signal for use in correcting for high frequency phase shift distortion;
    deriving the second derivative signal of said filtered input signal for use in correcting for high frequency amplitude distortion;
    adjusting the amplitudes of said filtered input signal, said first derivative signal and said second derivative signal;
    combining said adjusted filtered input signal with said adjusted first derivative signal for correcting asymmetric pulses caused by high frequency phase shift distortion and with said adjusted second derivative signal for correcting high frequency amplitude distortion to form an amplitude and phase equalized output signal.

5. The method recited in claim 4, further comprising the steps of:
   selecting a value C for said capacitance and a value L for said inductance to resonate said series tuned circuit above the frequency of said input signal;
   selecting a value R for said resistance to provide a circuit damping ratio to assure no significant phase distortion of said input signal; and
   coupling said input signal across said series tuned circuit.

6. A method of amplitude and phase equalizing a pulse input signal representing magnetic transitions recorded on magnetic recording media with a resistance, a capacitance and an inductance arranged in a series tuned circuit configuration, comprising the steps of:
   filtering said input signal with said series tuned circuit to form a filtered input signal;
   adjusting the amplitude of said filtered input signal;
   deriving a first derivative signal of said filtered input signal for use in correcting for high frequency phase shift distortion;
   adjusting the amplitude of said first derivative signal;
   deriving a second derivative signal of said filtered input signal for use in correcting for high frequency amplitude distortion;
   adjusting the amplitude of said second derivative signal;
   combining said adjusted filtered input signal and said adjusted first derivative signal for correcting asymmetric pulses caused by high frequency phase shift distortion to form a tilted signal;
   combining said adjusted filtered input signal and said adjusted second derivative signal for correcting overly broad pulses resulting from high frequency amplitude distortion to form a slimmed signal; and
   combining said tilted signal and said slimmed signal to form an amplitude and phase equalized output signal.

7. The method recited in claim 6, further comprising the steps of:
   selecting a value C for said capacitance and a value L for said inductance to resonate said series tuned circuit above the frequency of said input signal;
   selecting a value R for said resistance to provide a circuit damping ratio to assure no significant phase distortion of said input signal; and
   coupling said input signal across said series tuned circuit.

8. A method of amplitude and phase equalizing an input signal having a frequency range with a resistance, a capacitance, and an inductance arranged in a serial resistance-capacitance-inductance (RLC) circuit configuration, comprising the steps of:
   selecting a value C for said capacitance and a value L for said inductance to resonate said RLC circuit above said input signal frequency range;
   selecting a value R for said resistance to provide a circuit damping ratio to assure no significant phase distortion of said input signal;
   coupling said input signal across said RLC circuit;
   amplifying a potential drop across said capacitance by a factor K1 to form an amplified signal;
   amplifying a potential drop across said resistance by a factor K2 to form an amplified first derivative signal;
   amplifying a potential drop across said inductance by a factor K3 to form an amplified second derivative signal; and
   combining said amplified signal, said amplified first derivative signal and said amplified second derivative signal to form an amplitude and phase equalized output signal.

9. The method recited in claim 8, wherein said step of amplifying the potential across said capacitance includes the step of adjusting said amplification factor K1 to set the output level of said equalized output signal.

10. The method recited in claim 9, wherein said step of amplifying the potential across said resistance includes the step of adjusting said amplification factor K2 to minimize high frequency signal component phase shift in said output signal.

11. The method recited in claim 10, wherein said step of amplifying the potential across said inductance includes the step of adjusting said amplification factor K3 to minimize high frequency signal component amplitude distortion in said output signal.

12. The method recited in claim 8, wherein said step of amplifying the potential across said resistance includes the step of adjusting said amplification factor K2 to minimize high frequency signal component phase shift in said output signal.

13. The method recited in claim 12, wherein said step of amplifying the potential across said inductance includes the step of adjusting said amplification factor K3 to minimize high frequency signal component amplitude distortion in said output signal.

14. The method recited in claim 8, wherein said step of amplifying the potential across said inductance includes the step of adjusting said amplification factor K3 to minimize high frequency signal component amplitude distortion in said output signal.

15. The method recited in claim 14, wherein said step of amplifying the potential across said capacitance includes the step of adjusting said amplification factor K1 to set the output level of said equalized output signal.

16. A method of amplitude and phase equalizing an input signal having a frequency range with a resistance, a capacitance, and an inductance arranged in a serial resistance-capacitance-inductance (RLC) circuit configuration, comprising the steps of:
   selecting a value C for said capacitance and a value L for said inductance to resonate said RLC circuit above said input signal frequency range;
   selecting a value R for said resistance to provide a circuit damping ratio to assure no significant phase distortion of said input signal;
   coupling said input signal across said RLC circuit;
   amplifying a potential drop across said capacitance by a factor K1 to form an amplified signal;
   adjusting said amplification factor K1 to set the output level of said output signal;
   amplifying a potential drop across said resistance by a factor K2 to form an amplified first derivative signal;
   adjusting said amplification factor K2 to minimize high frequency signal component phase shift in said output signal;
   amplifying a potential drop across said inductance by a factor K3 to form an amplified second derivative signal;
   adjusting said amplification factor K3 to minimize high frequency signal component amplitude distortion in said output signal; and combining said amplified signal, said amplified first derivative signal and said second derivative signal to form an amplitude and phase equalized output signal.

17. A circuit for amplitude and phase equalizing an input signal comprising:
- a series tuned circuit having a resistance of value R, a capacitance of value C and an inductance of value L;
- a first amplifier having an adjustable amplification factor K1 coupled across said capacitance and forming an amplified output signal proportional to the potential across said capacitance;
- a second amplifier having an adjustable amplification factor K2 coupled across said resistance and forming an amplified first derivative output signal proportional to the potential across said resistance;
- a third amplifier having an adjustable amplification factor K3 coupled across said inductance and forming an amplified second derivative output signal proportional to the potential across said inductance; and
- means for combining said amplified output signal, said amplified first derivative output signal and said amplified second derivative output signal to form an amplitude and phase equalized output signal.

18. The circuit of claim 17, wherein said capacitance and said inductance resonate said series tuned circuit above the frequency of said input signal and said resistance provides a damping ratio to assure no significant phase distortion of said input signal.

19. A circuit for amplitude and phase equalizing a pulse input signal representing magnetic transitions recorded on magnetic recording media comprising:
- a series tuned circuit having a resistance of value R, a capacitance of value C and an inductance of value L;
- a first means coupled across said capacitance for adjusting the potential across said capacitance forming an adjusted output signal;
- a second means coupled across said resistance for adjusting the potential across said resistance forming an adjusted first derivative output signal;
- a third means coupled across said inductance for adjusting the potential across said inductance forming an adjusted second derivative output signal; and
- means for combining said adjusted output signal with said adjusted first derivative output signal for correcting asymmetric pulses caused by high frequency phase shift distortion and for combining said adjusted output signal and said adjusted first derivative output signal with said adjusted second derivative output signal for correcting high frequency amplitude distortion to form an amplitude and phase equalized output signal.

20. The circuit of claim 19, wherein said capacitance and said inductance resonate said tuned circuit above the frequency of said pulse input signal and said resistance provides a damping ratio to assure no significant phase distortion of said input signal.

* * * * *